Jan. 4, 1949.  R. W. FERNSTRUM  2,457,991
ENGINE TEMPERATURE CONTROL DEVICE
Filed Sept. 26, 1945  2 Sheets-Sheet 1
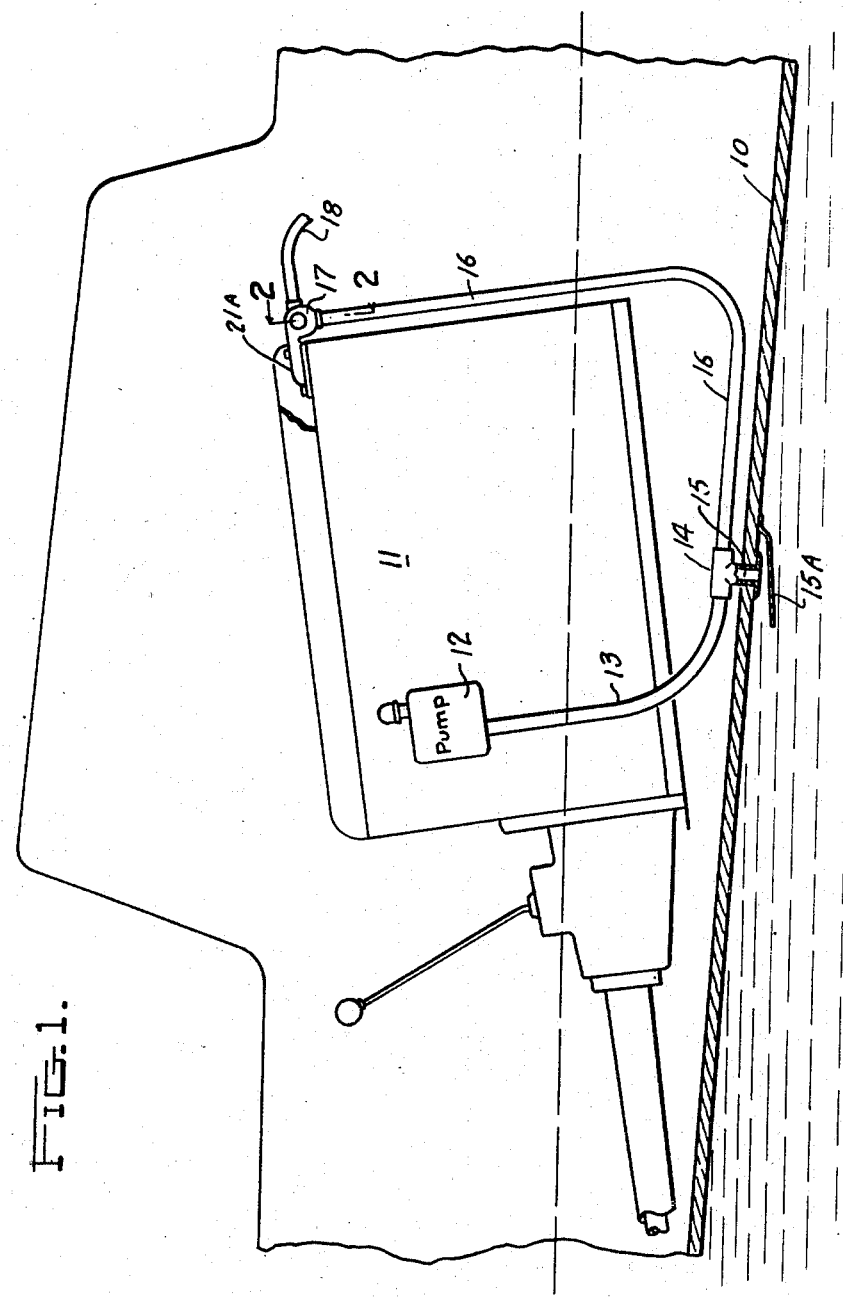
INVENTOR
Robert W. Fernstrum
BY Hauke T. Hardesty
ATTORNEYS Jan. 4, 1949.  R. W. FERNSTRUM  2,457,991
ENGINE TEMPERATURE CONTROL DEVICE
Filed Sept. 26, 1945  2 Sheets-Sheet 2
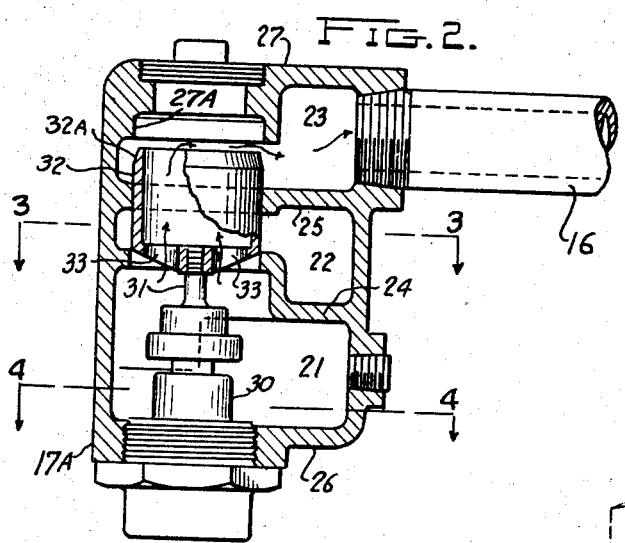
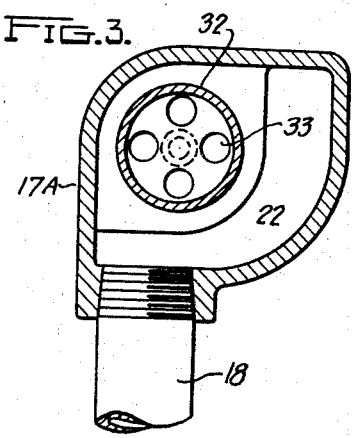
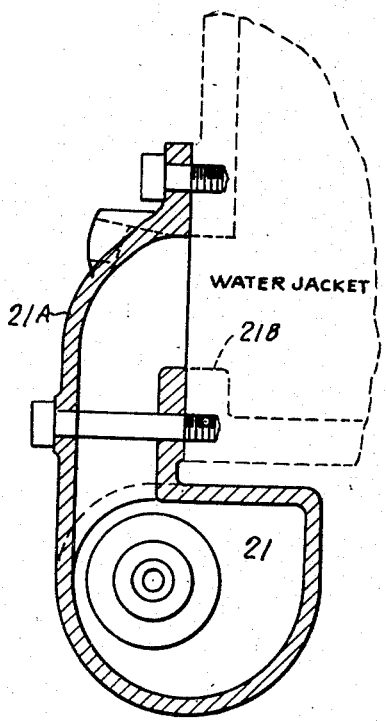
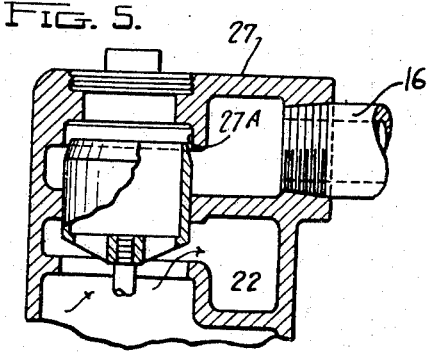
INVENTOR
Robert W. Fernstrum
BY
ATTORNEY Patented Jan. 4, 1949

2,457,991

UNITED STATES PATENT OFFICE 2,457,991

ENGINE TEMPERATURE CONTROL DEVICE

Robert W. Fernstrum, Detroit, Mich., assignor to Gray Marine Motor Company, Detroit, Mich., a corporation of Michigan Application September 26, 1945, Serial No. 618,692

1 Claim. (Cl. 123—178)

The present invention relates to engine temperature control devices and more specifically to controls for marine engines.

Among the objects of the invention is a means for controlling the temperature of the cooling water being pumped through the water jacket of the engine.

Another object is a device of the sort indicated which will provide for quick warm up and for maintenance of optimum jacket temperature regardless of the initial temperature of the water in which the boat happens to be and from which source the cooling water is drawn for circulation through the jacket.

Another object is means which will automatically provide for recirculation of some or all of the jacket contained water until the optimum temperature is reached and apportion the recirculated water and added cool water to maintain such temperature.

Other objects and advantages will be apparent to those skilled in the art upon reference to the following description and the accompanying drawings in which Fig. 1 is a more or less diagrammatic sectional view of a boat and power unit showing the preferred location of the device and indicating its use.

Fig. 2 is a sectional view on line 2—2 of Fig. 1.
Fig. 3 is a sectional view on line 3—3 of Fig. 2.
Fig. 4 is a section on line 4—4 of Fig. 2.
Fig. 5 is a view showing a portion of the section of Fig. 2 with the parts in a different position.

In the drawings, a boat is indicated at 10 with a suitable engine at 11. This is a water jacketed engine and through the jacket, water is circulated by a pump 12. The inlet side of pump 12 connects with a conduit 13 leading from a T 14 to which opens the short inlet conduit 15 admitting water from outside of the boat hull and protected by a suitable shield 15A. To the T 14 is also connected a conduit 16 connected at its other end to the thermal control unit 17, and the latter is in turn mounted on the engine so as to receive water from the water jacket of the engine. A second conduit 18 is also connected to the unit 17 and leads to a suitable point of discharge (not shown) overboard.

In operation, the pump 12 draws its supply of water from either or both of conduits 15 and 16 and forces it through the engine jacket to the unit 17. From the latter, discharge is through either or both conduits 16 and 18.

The thermal unit 17 is shown in detail in Figs. 2 to 5 and consists of a housing 17A containing three chambers 21, 22, and 23 of which chamber 21 is the inlet chamber, open to the water jacket through the flanged extension 21A fixed over the water jacket outlet 21B.

Chamber 23 is the recirculation chamber and is connected to the return conduit 16. Chamber 22 is the outlet chamber to which is connected the conduit 18. The several chambers are separated by cross walls 24 and 25 provided with axially aligned openings which also are in alignment with a suitable tapped opening in the end wall 26 of chamber 21 and in the latter is mounted a thermostat unit 30 so constructed that changes in temperature produce an axial movement of a plunger 31. Mounted on the plunger 31 is a cylindrical valve member 32 open at its outer end and provided with a plurality of large openings 33 in its bottom wall so that, under certain conditions, water may flow axially through the valve member.

The valve member 32 is of such diameter as to have a loose sliding fit in the opening through walls 24 and 25 and is of such length as to extend from the surface of wall 24, through wall 25 to within a short distance of the end wall 27 or rather to a suitable seat 27A formed on the wall 27. It is also, as shown, provided with a small bevel 32A at its outer edge in order to provide for smoother operation, the bevel producing a less abrupt opening of the valve at this point.

In assembling the unit 17, the thermostat unit 30 with the valve member 32 is so located that, at ordinary low temperature, the valve is in a position approximately that of Fig. 2. That is, it is in a position such that all or substantially all of the water from chamber 21 will pass longitudinally through the valve to chamber 23 and back through conduit 16 to the pump 12. Under such conditions, there is only a small quantity of water in the jacket and conduits and consequently it quickly becomes heated.

As the water heats, it, of course heats the thermostat 30 and the valve 32 moves toward the position of Fig. 5 in which position the water from chamber 21, instead of passing through the chamber 23 and conduit 16, flows around the valve to chamber 22 and out through conduit 18 to be discarded.

Of course, with intermediate positions of the valve 32, the flow is divided between chambers 22 and 23 and more or less of the flow into chamber 21 from the jacket is recirculated, while the rest is discharged, such discharged water being replaced by flow into the system through inlet 15.

It should be noted that the diameter and length of the valve 32 and the diameter of the openings 33 may be such that the total flow through or past it, or both, equals the inflow from the jacket and that consequently no back pressure will develop. The valve will, therefore, readily and accurately respond to the thermal variation.

Now having described the invention and the preferred embodiment thereof, it is to be understood that said invention is to be limited, not to the specific details herein set forth, but only by the scope of the claim which follows.

I claim:

Temperature control means for water jacketed marine engines having a water circulating pump, said control means consisting of a casing having a water inlet connected to the water outlet of the engine jacket and having a pair of outlets for the water one outlet of which is connected to the intake of said pump and the other outlet leading to a point of discharge, said casing being divided by a pair of partitions into three chambers, an end one of which is the inlet chamber, said partitions and the end walls of said casing being substantially parallel and provided with a through passage, a unit consisting of a thermostat and a sleeve valve having a beveled end mounted in alignment on a screw plug, threaded into the end wall adjacent the inlet chamber and having the thermostat in said inlet chamber supporting the valve extending through said partitions, and a seat in the other end wall opposite the other end of said passage and into which the beveled end of said valve is adapted to move, said valve when the cooling water temperature is low, so located that water entering said casing is substantially all directed into the chamber leading to the pump and as said temperature increases is moved endwise by said thermostat to direct a part of said water to the discharge outlet in increasing proportion.

ROBERT W. FERNSTRUM.

REFERENCES CITED

The following references are of record in the file of this patent:

UNITED STATES PATENTS

| Number | Name | Date |
|---|---|---|
| 1,311,809 | Giesler | July 29, 1919 |
| 1,354,740 | Giesler | Oct. 5, 1920 |
| 1,940,090 | Hetherington | Dec. 19, 1933 |
| 2,228,446 | Drapeau | Jan. 14, 1941 |